US011740125B2

(12) United States Patent
Gatto et al.

(10) Patent No.: US 11,740,125 B2
(45) Date of Patent: Aug. 29, 2023

(54) IMAGING APPARATUS AND SPECTRAL DENSITY RECONSTRUCTION METHOD

(71) Applicant: Sony Corporation, Tokyo (JP)

(72) Inventors: Alexander Gatto, Stuttgart (DE); Günter Troll, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 86 days.

(21) Appl. No.: 16/861,221

(22) Filed: Apr. 29, 2020

(65) Prior Publication Data

US 2020/0348177 A1    Nov. 5, 2020

(30) Foreign Application Priority Data

Apr. 30, 2019  (EP) ..................... 19171922

(51) Int. Cl.
*G01J 3/28* (2006.01)
*G06T 11/00* (2006.01)

(52) U.S. Cl.
CPC ........... *G01J 3/2823* (2013.01); *G06T 11/003* (2013.01); *G01J 2003/283* (2013.01)

(58) Field of Classification Search
CPC .. G01J 3/2823; G01J 2003/283; G06T 11/003
USPC ......................................................... 356/456
See application file for complete search history.

(56) References Cited

U.S. PATENT DOCUMENTS

| | | | | |
|---|---|---|---|---|
| 5,844,241 A * | 12/1998 | Liu | .................. | G01T 1/2985 250/363.04 |
| 6,522,403 B2 | 2/2003 | Wilson et al. | | |
| 2006/0108509 A1 * | 5/2006 | Frangioni | .............. | A61B 5/415 250/208.1 |
| 2007/0182962 A1 * | 8/2007 | Bearman | .................. | G01J 3/18 356/328 |
| 2009/0221920 A1 * | 9/2009 | Boppart | ............... | A61B 5/6853 600/476 |
| 2014/0114181 A1 * | 4/2014 | Wu | ...................... | A61B 5/0073 600/425 |

OTHER PUBLICATIONS

Michael Descour, et al. "Computed-tomography imaging spectrometer: experimental calibration and reconstruction results", Applied Optics, 1. Aug. 1995.

(Continued)

*Primary Examiner* — Tarifur R Chowdhury
*Assistant Examiner* — Omar H Nixon
(74) *Attorney, Agent, or Firm* — XSENSUS LLP

(57) ABSTRACT

The present disclosure generally pertains to an imaging apparatus for computed tomography imaging spectroscopy, which has circuitry configured to:
   obtain object image data being representative of light stemming from an object and being subject to an optical path and to a multiplexing process caused by a diffraction grating; and
   perform a spectral density reconstruction from an image of the object by inputting the obtained object image data into an spectral density reconstruction algorithm being configured to numerically solve a first equation describing the transformation of the light stemming from the object caused by the optical path into the object image based on a reduction of a dimensionality of a first function indicative of the optical path based on a symmetry of the first function, thereby reconstructing the spectral density of the object.

20 Claims, 2 Drawing Sheets

(56) References Cited

OTHER PUBLICATIONS

Nathan Hagen, et al., "New grating designs for a CTIS imaging spectrometer—art. No. 65650N", Proceedings of SPIE, Optical Science Center, Apr. 2007.
Wikipedia, "Generalized minimal residual method", Jul. 25, 2017.
Wolfram Math World, "Minimal Residual Method", Sep. 15, 2018.

* cited by examiner

IMAGING APPARATUS AND SPECTRAL DENSITY RECONSTRUCTION METHOD

CROSS-REFERENCE TO RELATED APPLICATION

The present application claims priority to European Patent Application 19171922.8 filed by the European Patent Office on Apr. 30, 2019, the entire contents of which being incorporated herein by reference.

TECHNICAL FIELD

The present disclosure generally pertains to an imaging apparatus for computed tomography imaging spectroscopy and a spectral density reconstruction method for computed tomography imaging spectroscopy.

TECHNICAL BACKGROUND

Generally, computed tomography imaging spectroscopy (CTIS) is a known technique to measure the spectral density of an object. Its name reflects an analogy to computed tomography (CT), which is used in medicine for imaging three dimensional objects in a human body with X-rays. However, in CTIS, the third dimension is not space-like, but a wavelength. To achieve this, light stemming from an image of an object, which can be placed in a field stop, passes through a diffraction grating. This results in a diffraction pattern and thereby the spectral density of the object is multiplexed into a 2d observation plane. In order to reconstruct the spectral density of the object this multiplexing must be undone numerically.

However, spectral density reconstruction (also in other spectral imaging systems than CTIS) may consume a high amount of run-time, processing power and memory. Hence, known systems may be limited in their scalability to higher resolutions in both the spectral domain and in the spatial domain. Therefore, high resolution (e.g. HD) images may not be reconstructed with known systems and known systems may only reconstruct low resolution images, such that a real-time reconstruction may be difficult to be achieved or may be even impossible.

Although there exist techniques for reconstructing CTIS images, it is generally desirable to provide an imaging apparatus for CTIS and a spectral density reconstruction method for CTIS.

SUMMARY

According to a first aspect, the disclosure provides an imaging apparatus for computed tomography imaging spectroscopy, comprising circuitry configured to: obtain object image data being representative of light stemming from an object and being subject to an optical path and to a multiplexing process caused by a diffraction grating; and perform a spectral density reconstruction from an image of the object by inputting the obtained object image data into an spectral density reconstruction algorithm being configured to numerically solve a first equation describing the transformation of the light stemming from the object caused by the optical path into the object image based on a reduction of a dimensionality of a first function indicative of the optical path based on a symmetry of the first function, thereby reconstructing the spectral density of the object.

According to a second aspect, the disclosure provides a spectral density reconstruction method for computed tomography imaging spectroscopy, comprising: obtaining object image data being representative of light stemming from an object and being subject to an optical path and to a multiplexing process caused by a diffraction grating; and performing a spectral density reconstruction from an image of the object by inputting the obtained object image data into a spectral density reconstruction algorithm being configured to numerically solve a first equation describing the transformation of the light stemming from the object caused by the optical path into the object image based on a reduction of a dimensionality of a first function indicative of the optical path based on a symmetry of the first function, thereby reconstructing the spectral density of the object.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
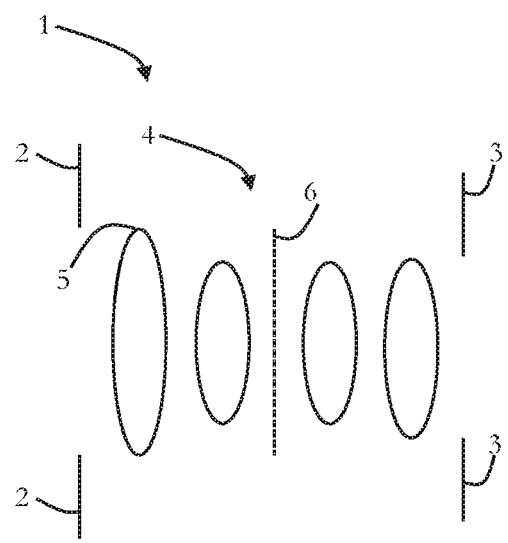
FIG. 1 schematically depicts an optical stack according to the present disclosure.

Before a detailed description of the embodiments under reference of FIG. 1 is given, general explanations are made.

As described in the outset, known CTIS systems may not be suitable for a real-time reconstruction of an image. Moreover, current systems may not be suitable for providing the necessary processing power or memory.

Hence, it has been recognized that it is desirable to provide a fast, high-resolution reconstructing of a spectrally and spatially multiplexed signal without increasing available memory resources.

Consequently, some embodiments pertain to an imaging apparatus (or spectral density reconstruction apparatus) for computed tomography imaging spectroscopy, including circuitry configured to: obtain object image data being representative of light stemming from an object and being subject to an optical path and to a multiplexing process caused by a diffraction grating; and perform a spectral density reconstruction of an image of the object by inputting the obtained object image data into a spectral density reconstruction algorithm being configured to numerically solve a first equation describing the transformation of the light stemming from the object caused by the optical path into the object image based on a reduction of a dimensionality of a first function indicative of the optical path based on a symmetry of the first function, thereby reconstructing the spectral density of the object.

The imaging apparatus may be any apparatus, which can be implemented in or be used for a computed tomography imaging spectroscopy (CTIS), and may include a processor (a central processing unit (CPU), graphics processing unit (GPU), multiple processors, or the like), a field programmable gate array (FPGA), or the like. It may also be a or include plurality of processors, as they may be found in a computer or a server, or it may be one or a plurality of computers or servers, as in a computing center, a server farm, or the like.

The circuitry may be a set or parts of processors, computers, or the like, as it is generally known, included in the apparatus.

The circuitry may be configured to obtain object image data being representative of light stemming from an object and being subject to an optical path and to a multiplexing process caused by a diffraction grating.

For example, in some embodiments, light stemming from an object or from an image of the object is subject to an optical path (which may include a lens, a field stop, a diaphragm, a mirror, a grating, also a plurality of these elements, or none, or any combination of them, as it is generally known).

In such embodiments, the light stemming from the object (or its image) is multiplexed or convolved (e.g. diffracted) by the diffraction grating. The diffraction grating may be or include one or more (consecutive, but not limited to that) gratings having a structure, such that incident light is being diffracted to a diffraction pattern, as it is generally known, and therefore also higher diffraction orders (higher than the first order) can be imaged, e.g. on a monochromatic sensor.

The higher diffraction orders show dispersion, i.e. a split of an intensity spectrum into different spatial regions, which overlap. Thereby, a spectrally multiplexed signal may be generated and postprocessing may be needed to demultiplex (or deconvolve) the spectrally multiplexed signal in order to reconstruct the spectral density of the object (or a scene, or the like).

The object image data may be (analog or digital) data, which are generated in response to a photoelectric conversion or photo detection process on a chip or sensor, or the like, which is sensitive to incident light or radiation, such as a photodiode, a CMOS (complementary metal oxide semiconductor) sensor, a CCD (charge coupled device) chip, a single or multiple SPADs (single photon avalanche diodes), or the like.

The object image data may be raw data or processed, such that they are in a state, in which only the spectral density reconstruction algorithm may be applied without any (pre) processing.

The object may be any object, which (i.e. light stemming from it) may be subject to the optical path, also with further optical elements. For example, an image of a big object may be subject to the optical path with a (one or more) reducer lens or an image of a small object may be brought into the optical path with a (one or more) magnifying lenses. Of course, the present disclosure is not limited in that regard. Reducer lenses and magnifying lenses may for example be combined, as it is generally known and may magnify the size of the object image with respect to the object, reduce the size or keep the size the same, as it is generally known.

The circuitry may further be configured to perform a spectral density reconstruction of the image of the object by inputting the obtained object image data into an spectral density reconstruction algorithm being configured to numerically solve a first equation describing the transformation of the light stemming from the object caused by the optical path into the object image based on a reduction of a dimensionality of a first function indicative of the optical path, thereby reconstructing the image of the object.

The spectral density reconstruction may output a representation of the image (or corresponding data), for example on a screen, as data, or the like, wherein the data are based on the spectral density reconstruction algorithm.

The spectral density reconstruction algorithm may be a known algorithm, such as a minimal residual method, or the like, which processes the object image data and thereby determines a value corresponding to a light intensity of the object image.

The spectral density reconstruction algorithm may, in order to determine the value, numerically solve the first equation, which is, in some embodiments, a matrix or operator equation, in other embodiments, an integral equation, a differential equation, an integro-differential equation, or the like.

The first equation may be based on a reduction of a dimensionality of a first function indicative of the optical path.

For example, the first function may be a multi-dimensional function, such as a (multi-dimensional) vector, a function with a plurality of variables, a matrix function, or the like, such that a processing time of a numerical solving of the first equation based on the first function may be reduced by reducing the dimensions (or the dimensionality). The reduction of the dimensionality may be achieved by using or assuming a symmetry of the system, a transformation (e.g. diagonalization) of the function, an approximation, a regularization, or the like.

For example, the dimensionality may be reduced from five dimensions to three dimensions by using a symmetry of the first function.

In some embodiments, the first function is a point spread function (PSF). The PSF may be used to describe a spreading (e.g. smearing) of the light passing the optical path dependent on the optical elements and of a distance, or the like, as it is known.

In some embodiments, the first equation is based on a second equation including the first function and a second function indicative of a spectral density of the object.

The second equation may be a generic equation describing a distribution of a light intensity. For example, the second equation may include the following (eq. 1):

$$g(u,v) = H * f(u,v) \qquad \text{eq. 1}$$

In eq. 1, $g(u,v)$ includes the light intensity on an observation plane (e.g. a CMOS chip, CCD chip, screen, etc., in other words an image on the sensor) with the spatial coordinates u and v, H is an operator (e.g. a matrix, a (non-)linear operator, etc.) for transforming $f(u,v)$ (including a spectral density of the imaged object) to the light intensity $g(u,v)$ (hereinafter referred to as g) on an image plane (e.g. the image sensor).

The operator H may be any operator known in the art. In some embodiments H may include an integral operation, such as (eq. 2):

$$H * f(u,v) = \int_0^\infty \int_\Omega p(u,v,\xi,\eta,\upsilon) * f(\xi,\eta,\upsilon) d\xi d\eta d\upsilon \qquad \text{eq. 2}$$

In eq. 2, the application of the operator H to the function $f(u,v)$ may result in a transformation of the spatial coordinates u, v into the data cube coordinates $\xi,\eta,\upsilon$. Moreover, the spectral density $f(\xi,\eta,\upsilon)$ (e.g. spectral data cube) may be multiplied with the first function, which is, in such embodiments, a point spread function $p(u,v,\xi,\eta,\upsilon)$ (hereinafter referred to as p), which is based on a spatially incoherent illumination (e.g. a correlation of the points of a wavefront of an illumination, such as a laser, transverses to the direction of propagation).

In other embodiments, a temporal incoherent illumination (e.g. a correlation of a light wave's phase transverses to the direction of propagation), is the basis for the operator H.

For the reconstruction of the image of the object, $f(\xi,\eta,\upsilon)$ may be found with the help of the following equation, eq. 3:

$$g(u,v) = \int_0^\infty \int_\Omega p(u, v, \xi, \eta, v) * f(\xi, \eta, v) d\xi d\eta dv \quad \text{eq. 3}$$

Eq. 3 is derived by equating eq. 1 and eq. 2 and eq. 3 may include the second equation, as described herein.

In order to find $f(\xi,\eta,\upsilon)$ (hereinafter referred to as f) with a known p and g, an inverse problem, as it is generally known, may be solved (in some embodiments, the inverse problem is to find p with known f and g).

In some embodiments, the inverse problem is a Fredholm problem of the first kind and may be ill-posed (e.g. small disturbances or inaccuracies in determining the operator H or p may lead to an increased noise signal in a measurement).

For addressing the inverse problem, a regularization of the operator H may be utilized.

Hence, in some embodiments, the second equation includes a first operator including the first function and the first equation is further based on a regularization of an inverse problem including the second equation.

First, the operator H may be discretized in order to numerically solve the inverse problem. By discretization, a discrete linear (second) operator may be derived (to which is hereinafter referred to as A).

Therefore, in some embodiments the first equation is further based on a discretization of the first operator to a second operator being a model operator of the optical system (i.e. describes the optical system exemplarily).

As described herein, the inverse problem may be ill-posed. Therefore, spatial and spectral regularization terms may be added, similarly to a total Tikhonov regularization (TTR).

From this, eq. 4 may be derivable, which may be interpreted as a least square optimization problem with two Tikhonov parameters:

$$f^* = \arg\min_f \|Af-g\|_2^2 + \lambda^*\|B^*f\|_2^2 + \mu^*\|D^*f\|_{2,2}^1 \quad \text{eq. 4}$$

In eq. 4, f* is a function from the class of functions f, which minimize the expression on the right side of eq. 4. $\arg\min_f$ is the argmin function, as it is generally known, $\lambda$ is a first Tikhonov parameter, $\mu$ is a second Tikhonov parameter (e.g. adaptive penalty), wherein $\lambda$ and $\mu$ may be larger than zero. B is a Tikhonov matrix of order 2 for smoothing the light spectra and D is a two dimensional gradient for smoothing in the spatial domain.

$\mu$ may be set to zero in the neighborhood of candidate contours (e.g. below a threshold distance to the object image).

Thus, in some embodiments, the second equation is based on the formula:
$f^* = \arg\min_f \|Af-g\mu_2\|^2 + \lambda^*\|B^*f\|_2^2 + \mu^*\|D^*f\|_{2,2}^1$, f any spectral density and f* the reconstructed spectral density minimizing an objective function of this optimization problem.

For finding f*, eq. 4 may be transformed in to eq. 5, wherein eq. 5 may be interpreted as a linear problem in f:

$$(A^\dagger A + \lambda B^\dagger B + \mu D^\dagger D)f^* = A^\dagger g \quad \text{eq. 5}$$

In eq. 5, the dagger symbol † denotes an adjoint of the respective operators, A, B and D, wherein $D^\dagger$ may correspond to a negative of a divergence operator.

Hence, in some embodiments, the first equation includes $(A^\dagger A + \lambda B^\dagger B + \mu D^\dagger D)f^* = A^\dagger g$, A being the second operator, B being a Tikhonov matrix of arbitrary order, D being a two-dimensional gradient, $A^\dagger$ being an adjoint of A, $B^\dagger$ being an adjoint of B, $D^\dagger$ being an adjoint of D, $\mu$ and $\lambda$ being positive numbers, f* being the reconstructed spectral density and g being a light intensity (of the object) measured on an observation plane.

In some embodiments, the first function is derived based on a 4f system, wherein the 4f system may be a kind of test system which is generally known and which can be simulated and theoretically described. In particular, the function p may be reduced in its dimensionality. As described above, p may depend on five variables, namely u, v, $\xi$, $\eta$, and $\upsilon$.

Solving the above described inverse problem in these five dimensions may result in a high consumption of processing power for high resolutions (e.g. HD images), and may therefore be a time-consuming process. Moreover, solving matrix equation of high orders and/or dimensionality may require a huge amount of computing memory, which may even exceed currently known systems.

Hence, p may be transformed into the function h, as displayed in eq. 6:

$$p(u,\upsilon,\xi,\eta,\upsilon) = h(u+\xi,\upsilon+\eta,\upsilon) \quad \text{eq. 6}$$

In eq. 6, h is a point spread function of a point source on the optical axis. Eq. 6 is derived by a consideration of symmetries in a spatially invariant optical system. In such systems, the operator A may become a convolution or a cross-correlation for a 4f system.

Hence, in some embodiments, the reduction of the dimensionality is based on a symmetry of the first function. The reduction of dimensionality, thus, may also drastically reduce the needed computing memory.

Taking into account eq. 6, eq. 5 may be solved iteratively (e.g. numerically) with an spectral reconstruction algorithm, as described herein.

In some embodiments, a Fast Fourier Transformation may be utilized.

In some embodiments, the spectral reconstruction algorithm is a minimal residual (MR) algorithm for numerically solving the first equation.

The MR algorithm may include the following steps, which are now described as pseudocode, and are only given for illustration purposes without limiting the present disclosure in that regard:

1: $x^{(0)}$, e.g. $x^{(0)} \leftarrow Ty$

2: $r_0 \leftarrow y - T*x^{(0)}$, $d \leftarrow r_0$, $Td \leftarrow T*r_0$, $k \leftarrow 0$ 3: repeat 4: $\alpha \leftarrow \langle r_k, T*r_k\rangle / \|Td\|_2^2$ 5: $x^{(k+1)} \leftarrow x^{(k)} + \alpha * d$ 6: $r_{k+1} \leftarrow r_k + \alpha * Td$ 7: $\beta \leftarrow \left\{r_{k+1}, \dfrac{T*r_{k+1}}{\langle r_k,} T*r_k\right\}$ 8: $d \leftarrow r_{k+1} + \beta * d$ 9: $Td \leftarrow T*r_{k+1} + \beta * Td$ 10: $k \leftarrow k+1$ 11: until stopping condition 12: return $x^{k+1}$ In this pseudocode, the first step may be an initialization and the sixth step may describe a residual vector.

The MR algorithm, which is based on the pseudocode, may solve, as described, eq. 5, or its general form (eq. 7):

$$Tf=y \qquad \text{eq. 7}$$

In eq. 7, f may correspond to f* of eq. 5, T may correspond to the expression in the brackets on the left side of eq. 5, and y may correspond to the right side of eq. 5.

Some embodiments pertain to a spectral density reconstruction method for computed tomography imaging spectroscopy, including: obtaining object image data being representative of light stemming from an object and being subject to an optical path and to a multiplexing process caused by a diffraction grating; and performing a spectral density reconstruction of an image of the object by inputting the obtained object image data into a spectral density reconstruction algorithm being configured to numerically solve a first equation describing the transformation of the light stemming from the object caused by the optical path into the object image based on a reduction of a dimensionality of a first function indicative of the optical path based on a symmetry of the first function, thereby reconstructing the spectral density of the object, as described herein.

The method may be performed by an imaging apparatus, as described herein, without limiting the present disclosure in that regard. The method may also be performed by a computer, a processor, or the like.

In some embodiments the first function is a point spread function, as described herein. In some embodiments, the first equation is based on a second equation including the first function and a second function indicative of a spectral density of the object, as described herein. In some embodiments, the second equation includes a first operator including the first function and the first equation is further based on a regularization of an inverse problem including the second equation, as described herein. In some embodiments, the first equation is further based on a discretization of the first operator to a second operator being a model operator of the optical system, as described herein. In some embodiments, the first equation includes $(A^{\dagger}A+\lambda B^{\dagger}B+\mu D^{\dagger}D) f^{*}=A^{\dagger}g$, A being the second operator, B being a Tikhonov matrix of order 2, D being a two-dimensional gradient, $A^{\dagger}$ being an adjoint of A, $B^{\dagger}$ being an adjoint of B, $D^{\dagger}$ being an adjoint of D, $\mu$, and $\lambda$ being positive numbers, f* being the reconstructed spectral density g being a light intensity measured on an observation plane, as described herein. In some embodiments, the second equation is based on the formula: $f^{*}=\text{argmin}_{f}\|Af-g\|_{2}^{2}+\lambda^{*}\|B^{*}f\|_{2}^{2}+\mu^{*}\|D^{*}f\|_{2,2}^{1}$, f being any spectral density and f* is the reconstructed spectral density minimizing an objective function of this optimization problem, as described herein. In some embodiments, the first function is derived based on a 4f system, as described herein. In some embodiments, the reduction of the dimensionality is based on a symmetry of the first function, as described herein. In some embodiments, the spectral density reconstruction algorithm is a minimal residual algorithm solving the first equation, as described herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 1, an optical stack 1 according to the present disclosure is schematically depicted. The optical stack 1 includes two apertures 2 and 3 to channel incoming light and a compound lens 4, which includes a plurality of lenses 5 and a diffraction grating 6.

The plurality of lenses 5 (which is not limited to the number of four) of the compound lens 4 are depicted as convex lenses, but the present disclosure is not limited in that regard and this representation is only provided for illustrational purposes. The lenses may be any kind of lenses, such as concave, fisheye, or the like, also the plurality of lenses 5 may include different kinds of lenses.

The compound lens includes the diffraction grating 6, which is integrated into the compound lens 4, in this embodiment. However, in other embodiments, the diffraction grating 6 may be at other positions of the compound lens or before or after the compound lens or before or after the rest of the optical stack. Also, more than one diffraction gratings may be included at different positions, or a plurality of diffraction gratings (e.g. three) may be consecutively ordered.

The diffraction grating 6 multiplexes (or convolves) incoming light, and thus creates a diffraction patterns on a screen.

Figure 2:
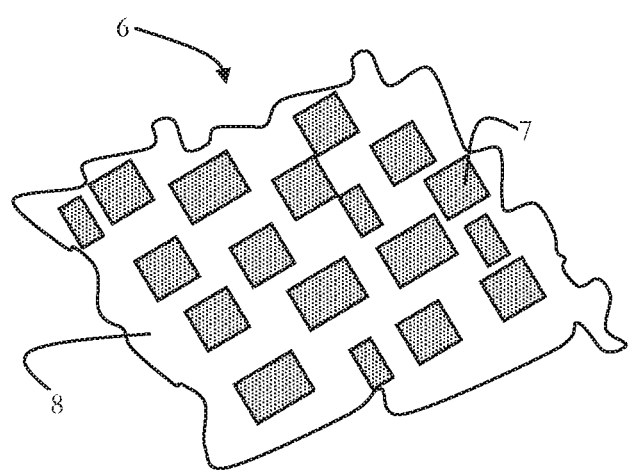
FIG. 2 depicts an illustration of a diffraction grating according to the present disclosure.

FIG. 2 depicts another illustration of the diffraction grating 6. The diffraction grating 6 includes a plurality of protrusions 7 on a surface 8 for creating a specific diffraction pattern.

Figure 3:
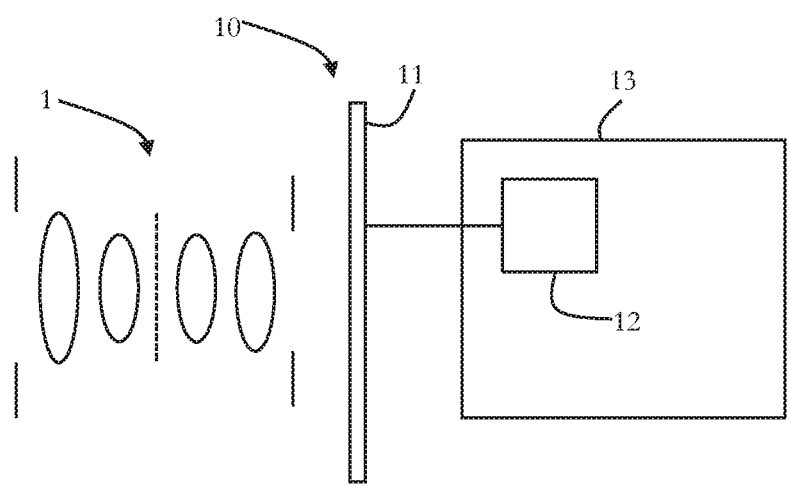
FIG. 3 is a block diagram of a CTIS system according to the present disclosure.

FIG. 3 illustrates, in a block diagram, a set-up of a CTIS system 10 according to the present disclosure. The CTIS system 10 includes the optical stack 1 through which light may pass. The CTIS system 10 further includes an image sensor 11 (in this embodiment a CMOS chip suitable for capturing HD images), which senses the light (and generally senses all the light present within the set-up). For illustrational purposes, the image sensor 11 and the optical stack are depicted to have a distance from each other. However, in some embodiments, the image sensor 11 may be directly coupled (or bonded) to the diaphragm 3 or be included in the diaphragm 3.

The sensed light signal is converted to image data in the image sensor 11 and passed to spectral density reconstruction circuitry 12, which is included in an imaging apparatus 13 in this embodiment.

The spectral density reconstruction circuitry 12 performs spectral density reconstruction, as it is described herein, utilizing the described MR algorithm, thereby reconstructing a spectral density of an object, which has been multiplexed by the diffraction grating 6 in the optical stack 1.

Figure 4:
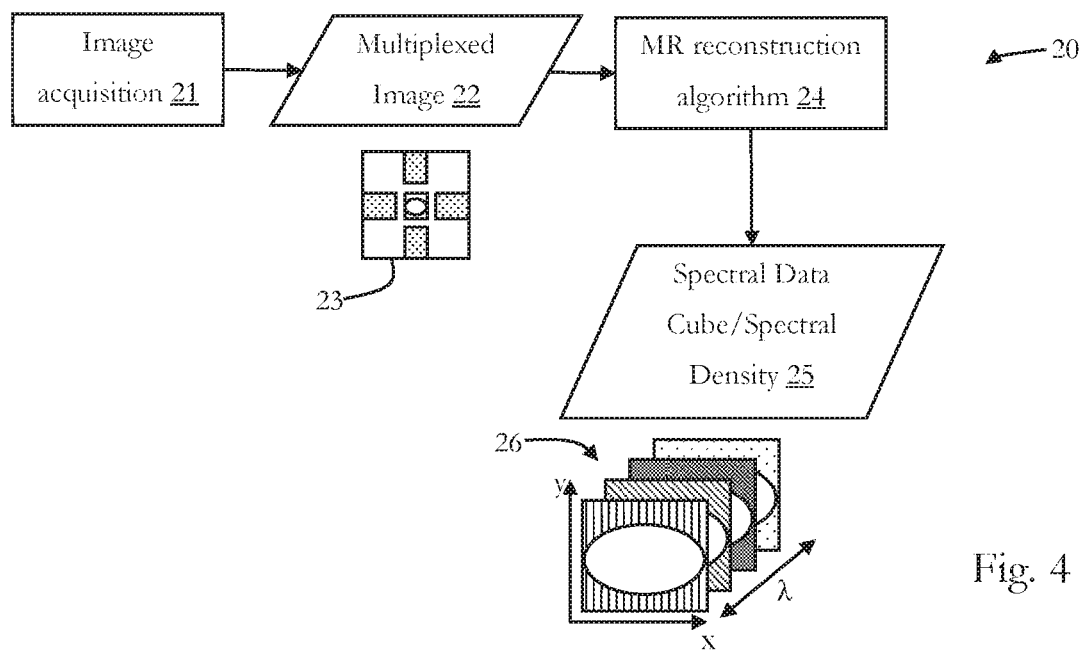
FIG. 4 shows a flow chart of a method according to the present disclosure.

FIG. 4 shows a flow chart of an embodiment of a method 20 according to the present disclosure.

At 21, an image (i.e. object image data) is acquired (e.g. on an image sensor, as described herein).

The object image data represent a multiplexed image, as shown at 22 with the representation 23 of the multiplexed image. In the center of the representation 23, the object is illustrated and the four rectangles around the center illustrate a diffraction pattern. In other embodiments, the diffraction pattern has six (or more or less) objects around the center, depending on the used diffraction grating.

Then, at 24, the MR reconstruction algorithm discussed herein is applied, resulting in the construction of a spectral data cube or spectral density at 25.

The spectral data cube (or spectral density) is represented at 26, having a (physical) intensity (x and y axis) over a wavelength distribution ($\lambda$). Hence, the object is reconstructed.

It should be recognized that the embodiments describe methods with an exemplary ordering of method steps. The specific ordering of method steps is however given for illustrative purposes only and should not be construed as binding. For example, the ordering of 21 and 22 in the embodiment of FIG. 4 may be exchanged. Other changes of the ordering of method steps may be apparent to the skilled person.

Please note that the division of the imaging apparatus 13 into units 12 and 13 is only made for illustration purposes and that the present disclosure is not limited to any specific division of functions in specific units. For instance, the imaging apparatus 13 could be implemented by a respective programmed processor, field programmable gate array (FPGA) and the like.

A method for controlling an electronic device, such as an imaging apparatus 13 discussed above, is described under reference of FIG. 4. The method can also be implemented as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An imaging apparatus for computed tomography imaging spectroscopy, comprising circuitry configured to:
  obtain object image data being representative of light stemming from an object and being subject to an optical path and to a multiplexing process caused by a diffraction grating; and
  perform a spectral density reconstruction of an image of the object by inputting the obtained object image data into a spectral density reconstruction algorithm being configured to numerically solve a first equation describing the transformation of the light stemming from the object caused by the optical path into the object image based on a reduction of a dimensionality of a first function indicative of the optical path based on a symmetry of the first function, thereby reconstructing the spectral density of the object.

(2) The imaging apparatus according to (1), wherein the first function is a point spread function.

(3) The imaging apparatus according to anyone of (1) or (2), wherein the first equation is based on a second equation including the first function and a second function indicative of a spectral density of the object.

(4) The imaging apparatus according to anyone of (1) to (3), wherein the second equation includes a first operator including the first function and the first equation is further based on a regularization of an inverse problem including the second equation.

(5) The imaging apparatus according to anyone of (1) to (4), wherein the first equation is further based on a discretization of the first operator to a second operator being a model operator of the optical system.

(6) The imaging apparatus according to anyone of (1) to (5), wherein the first equation includes $(A^{\dagger}A+\lambda B^{\dagger}B+\mu D^{\dagger}D)f^*=A^{\dagger}g$, A being the second operator, B being a Tikhonov matrix of arbitrary order, D being a two-dimensional gradient, $A^{\dagger}$ being an adjoint of A, $B^{\dagger}$ being an adjoint of B, $D^{\dagger}$ being an adjoint of D, $\mu$ and $\lambda$ being positive numbers, $f^*$ being the reconstructed spectral density and g being a light intensity measured on an observation plane.

(7) The imaging apparatus according to anyone of (1) to (6), wherein the second equation is based on the formula: $f^*=\mathrm{argmin}_f \|Af-g\|_2^2+\lambda^* \|B^*f\|_2^2+\mu^* \|D^*f\|_{2,2}^1$, f being any spectral density minimizing an objective function of this optimization problem.

(8) The imaging apparatus according to anyone of (1) to (7), wherein the image reconstruction algorithm is a minimal residual algorithm for numerically solving the first equation.

(9) An spectral density reconstruction method for computed tomography imaging spectroscopy, comprising:
  obtaining object image data being representative of light stemming from an object and being subject to an optical path and to a multiplexing process caused by a diffraction grating; and
  performing a spectral density reconstruction of an image of the object by inputting the obtained object image data into a spectral density reconstruction algorithm being configured to numerically solve a first equation describing the transformation of the light stemming from the object caused by the optical path into the object image based on a reduction of a dimensionality of a first function indicative of the optical path based on a symmetry of the first function, thereby reconstructing the spectral density of the object.

(10) The reconstruction method to (9), wherein the first function is a point spread function.

(11) The reconstruction method according to anyone of (9) or (10), wherein the first equation is based on a second equation including the first function and a second function indicative of a spectral density of the object.

(12) The reconstruction method according to anyone of (9) to (11), wherein the second equation includes a first operator including the first function and the first equation is further based on a regularization of an inverse problem including the second equation.

(13) The reconstruction method according to anyone of (9) to (12), wherein the first equation is further based on a discretization of the first operator to a second operator being a model operator of the optical system.

(14) The reconstruction method according to anyone of (9) to (1513 wherein the first equation includes $(A^{\dagger}A+\lambda B^{\dagger}B+\mu D^{\dagger}D)f^*=A^{\dagger}g$, A being the second operator, B being a Tikhonov matrix of order 2, D being a two-dimensional gradient, $A^{\dagger}$ being an adjoint of A, $B^{\dagger}$ being an adjoint of B, $D^{\dagger}$ being an adjoint of D, $\mu$ and $\lambda$ being positive numbers, $f^*$ being the reconstructed spectral density and g being a light intensity measured on an observation plane.

(15) The reconstruction method according to anyone of (9) to (14), wherein the second equation is based on the formula: $f^*=\mathrm{argmin}_f \|Af-g\mu_2^2+\lambda^* \|B^*f\|_2^2+\mu^* \|D^*f\|_{2,2}^1$, f being any spectral density and $f^*$ is the reconstructed spectral density minimizing an objective function of this optimization problem.

(16) The image reconstruction method according to anyone of (9) to (15), wherein the image reconstruction
(17) A computer program comprising program code causing a computer to perform the method according to anyone of (9) to (16), when being carried out on a computer.
(18) A non-transitory computer-readable recording medium that stores therein a computer program product, which, when executed by a processor, causes the method according to anyone of (9) to (16) to be performed.

The invention claimed is:

1. An imaging apparatus for computed tomography imaging spectroscopy, comprising:
    an image sensor configured to:
        obtain object image data being representative of light stemming from an object and being subject to an optical path and to a multiplexing process caused by a diffraction grating; and
    spectral reconstruction circuitry configured to:
        perform a spectral density reconstruction of an image of the object by inputting the obtained object image data into a spectral density reconstruction algorithm to numerically solve a first equation describing transformation of the light stemming from the object caused by the optical path into the object image based on a reduction of a dimensionality of a first function indicative of the optical path based on a symmetry of the first function, thereby reconstructing the spectral density of the object as a spectral data cube, and
        output a representation of the image of the object for output on a display screen using the spectral density reconstruction of the object in the form of the spectral data cube.

2. The imaging apparatus according to claim 1, wherein the first function is a point spread function.

3. The imaging apparatus according to claim 1, wherein the first equation is based on a second equation including the first function and a second function indicative of the spectral density of the object.

4. The imaging apparatus according to claim 3, wherein the second equation includes a first operator including the first function and the first equation is further based on a regularization of an inverse problem including the second equation.

5. The imaging apparatus according to claim 4, wherein the first equation is further based on a discretization of the first operator to a second operator being a model operator of an optical system associated with the optical path.

6. The imaging apparatus according to claim 5, wherein the first equation includes $(A^\dagger A+\lambda B^\dagger B+\mu D^\dagger D)f^*=A^\dagger g$, A being the model operator of the optical system, B being a Tikhonov matrix of arbitrary order, D being a two-dimensional gradient, $A^\dagger$ being the adjoint of A, $B^\dagger$ being the adjoint of B, $D^\dagger$ being the adjoint of D, $\mu$ and $\lambda$ being positive numbers (Tikhonov parameters), f* being the reconstructed spectral density and g being a light intensity measured on an observation plane.

7. The imaging apparatus according to claim 6, wherein the second equation is based on the formula: formula: $f^*=\mathrm{argmin}_f \|Af-g\|_2^2+\lambda^*\|B^*f\|_2^2+\mu^*\|D^*f\|_{2,2}^1$, f being any spectral density and f* is the reconstructed spectral density minimizing an objective function of this optimization problem.

8. The imaging apparatus according to claim 1, wherein the image reconstruction algorithm is a minimal residual algorithm for numerically solving the first equation.

9. A spectral density reconstruction method for computed tomography imaging spectroscopy, comprising:
    obtaining, using circuitry of an imaging apparatus for the computed tomography imaging spectroscopy, object image data being representative of light stemming from an object and being subject to an optical path and to a multiplexing process caused by a diffraction grating;
    performing, using the circuitry of the imaging apparatus for the computed tomography imaging spectroscopy, a spectral density reconstruction of an image of the object by inputting the obtained object image data into a spectral density reconstruction algorithm to numerically solve a first equation describing the transformation of the light stemming from the object caused by the optical path into the object image based on a reduction of a dimensionality of a first function indicative of the optical path based on a symmetry of the first function, thereby reconstructing the spectral density of the object; and
    outputting, using the circuitry of the imaging apparatus for the computed tomography imaging spectroscopy, a representation of the image of the object for output on a display screen based on the spectral density reconstruction of the image of the object.

10. The reconstruction method according to claim 9, wherein the first function is a point spread function.

11. The reconstruction method according to claim 9, wherein the first equation is based on a second equation including the first function and a second function indicative of the spectral density of the object.

12. The reconstruction method according to claim 11, wherein the second equation includes a first operator including the first function and the first equation is further based on a regularization of an inverse problem including the second equation.

13. The reconstruction method according to claim 12, wherein the first equation is further based on a discretization of the first operator to a second operator being a model operator of an optical system associated with the optical path.

14. The reconstruction method according to claim 13, wherein the first equation includes $(A^\dagger A+\lambda B^\dagger B+\mu D^\dagger D)f^*=A^\dagger g$, A being the model operator of the optical system, B being a Tikhonov matrix of arbitrary order, D being a two-dimensional gradient, $A^\dagger$ being the adjoint of A, $B^\dagger$ being the adjoint of B, $D^\dagger$ being the adjoint of D, $\mu$ and $\lambda$ being positive numbers, f* being the reconstructed spectral density and g being a light intensity measured on an observation plane.

15. The reconstruction method according to claim 14, wherein the second equation is based on the formula: $f^*=\mathrm{argmin}_f \|Af-g\|_2^2+\lambda^*\|B^*f\|_2^2+\mu^*\|D^*f\|_{2,2}^1$, f being any spectral density and f* is the reconstructed spectral density minimizing an objective function of this optimization problem.

16. The reconstruction method according to claim 9, wherein the image reconstruction algorithm is a minimal residual algorithm solving the first equation.

17. A computed tomography imaging spectroscopy (CTIS) system comprising:
    an image sensor configured to obtain object image data being representative of light stemming from an object and being subject to an optical path and to a multiplexing process caused by a diffraction grating; and
    an imaging apparatus comprised of circuitry configured to perform a spectral density reconstruction of an image of the object by inputting the obtained object image data into a spectral density reconstruction algorithm to numerically solve a first equation describing the transformation of the light stemming from the object caused by the optical path into the object image based on a reduction of a dimensionality of a first function indicative of the optical path based on a symmetry of the first function, thereby reconstructing a spectral data cube of the object, and output a representation of the image of the object for output on a display screen based on a resulting construction of a spectral data cube based on the spectral density reconstruction of the image of the object.

18. The computed tomography imaging spectroscopy (CTIS) system according to claim 17, wherein the first function is a point spread function.

19. The computed tomography imaging spectroscopy (CTIS) system according to claim 17,
wherein the first equation is based on a second equation including the first function and a second function indicative of the spectral density of the object, and
wherein the second equation includes a first operator including the first function and the first equation is further based on a regularization of an inverse problem including the second equation.

20. The computed tomography imaging spectroscopy (CTIS) system according to claim 17, wherein the image reconstruction algorithm is a minimal residual algorithm to numerically solve the first equation.

\* \* \* \* \*